United States Patent [19]

Takase et al.

[11] Patent Number: 5,750,267
[45] Date of Patent: May 12, 1998

[54] TRANSPARENT CONDUCTIVE LAMINATE

[75] Inventors: Mitsuo Takase, Kamagaya; Nobuhiro Fukuda, Yokohama; Toshihiro Dodo, Chigasaki, all of Japan

[73] Assignee: Mitsui Toatsu Chemicals, Inc., Tokyo, Japan

[21] Appl. No.: 554,596

[22] Filed: Nov. 6, 1995

Related U.S. Application Data

[62] Division of Ser. No. 186,922, Jan. 27, 1994, Pat. No. 5,493,102.

[30] Foreign Application Priority Data

| Jan. 27, 1993 | [JP] | Japan | 5-011536 |
| Jan. 29, 1993 | [JP] | Japan | 5-013262 |
| Apr. 2, 1993 | [JP] | Japan | 5-076540 |

[51] Int. Cl.$^6$ .................................. H05B 3/10
[52] U.S. Cl. ............... 428/469; 428/418; 428/458; 428/472; 428/697; 428/698; 428/699
[58] Field of Search ................ 428/698, 701, 428/699, 697, 418, 458, 472

[56] References Cited

U.S. PATENT DOCUMENTS

| 2,761,945 | 9/1956 | Colbert et al. |
| 2,932,710 | 4/1960 | Coale et al. |
| 3,895,219 | 7/1975 | Richerson et al. |
| 4,226,910 | 10/1980 | Dahlen et al. |
| 4,320,169 | 3/1982 | Yatabe et al. |
| 4,413,877 | 11/1983 | Suzuki et al. |
| 4,450,201 | 5/1984 | Brill et al. ................ 428/336 |
| 4,729,972 | 3/1988 | Kodama et al. |
| 4,749,845 | 6/1988 | Rasmussen et al. |
| 4,849,605 | 7/1989 | Nakamori et al. |
| 4,918,288 | 4/1990 | Carter et al. |
| 4,952,783 | 8/1990 | Aufderheide et al. |
| 5,000,528 | 3/1991 | Kawakatsu ................ 350/1.7 |
| 5,344,718 | 9/1994 | Hartig et al. ................ 428/623 |
| 5,411,794 | 5/1995 | Kawaguchi et al. ................ 428/698 |
| 5,543,229 | 8/1996 | Ohsaki et al. ................ 428/432 |

FOREIGN PATENT DOCUMENTS

| 0226901 | 7/1987 | European Pat. Off. |
| 0546302 | 6/1993 | European Pat. Off. |
| 58-126517 | 7/1983 | Japan. |
| 4-289685 | 10/1992 | Japan. |

*Primary Examiner*—Archene Turner
*Attorney, Agent, or Firm*—Burns, Doane, Swecker & Mathis

[57] ABSTRACT

A transparent panel heater which can be used for heating a window portion of liquid crystal displays, refrigerated showcases, freezed showcases, defrosters of windshields, and the like. The panel heater has a transparent substrate, a transparent conductive film formed on the substrate, a substantially light-transmittable metallic electrode-underlinglayer formed on the transparent conductive film and a pair of metallic electrodes which are provided for electrifying the conductive film and formed on the electrode-underlyinglayer. The transparent conductive film is a laminate of at least one transparent thin layer made of a nitride and/or a carbide and at least one substantially light-transmittable metallic layer. The transparent conductive film and electrode-underlying-layer are preferably formed by a dry process, and the electrodes are preferably formed by a wet plating method.

11 Claims, 5 Drawing Sheets

TRANSPARENT CONDUCTIVE LAMINATE

This application is a divisional of application Ser. No. 08/186,922, filed Jan. 27, 1994 now U.S. Pat No. 5,493,102.

BACKGROUND OF THE INVENTION (i) Field of the Invention

The present invention relates to a transparent panel heater which can be used as a portion of a window. More particularly, it relates to a transparent panel heater which can be used in liquid crystal displays, refrigerator showcases, freezer showcases, defrosters for windshields of cars and the like, and a transparent laminate for use in the transparent panel heater.

(ii) Description of the Related Art

In a freezer showcase or a refrigerator showcase, it has been necessary to prevent dew from condensing on the surface of a glass plate constituting its window. Therefore, a transparent conductive film has been formed on the glass surface, and predetermined electric power has been applied to the transparent conductive film to heat the glass surface.

In recent years, the demand for liquid crystal displays has increased, but when they are used in a cold environment, their operation is inconveniently slow. Thus, also in liquid crystal displays, the necessity of providing transparent panel heaters for temperature control has increased.

Conventionally, in a liquid crystal display which can be used under such conditions as in a cold environment, a mesh-like heating resistor has been disposed to heat it, as suggested in, for example, Japanese Patent Application Laid-open No. 126517/1983. In this constitution, however, it is difficult to uniformly heat the whole liquid crystal display, and the heating resistor comprising an opaque metal tends to inconveniently disturb an operator in watching the display.

A transparent heating element in which a transparent conductive film is formed on a transparent substrate has been suggested in, for example, U.S. Pat. No. 4,952,783. One exemplary constitution of such a heating element is shown in FIG. 1 attached hereto. That is, a transparent conductive film 52 is formed all over the surface of a transparent substrate 51, and a pair of electrodes 53 for feeding electric power to the transparent conductive film 52 are arranged at both the ends of the transparent conductive film 52. Furthermore, in order to protect the transparent conductive film 52 and the electrodes 53, a transparent protective layer 54 is formed all over the surface of the heating element. Here, the electrodes 53 are formed by applying a conductive printing material such as a silver paste on suitable positions of the transparent conductive film 52 by a screen printing method or the like, and then thermally treating the applied coating material. For the purpose of improving the reliability of the electrodes, Japanese Patent Application Laid-open No. 289685/1992 discloses electrodes constituted by sandwiching a metal foil with electrically conductive printing material layers.

In this kind of transparent panel heater, however, if the electrodes are constituted by an electrically conductive printing material such as the silver paste, the resistance of the conductive printing material itself is larger as compared with that of the transparent conductive film, and the contact resistance between the electrodes and the transparent conductive film tends to increase. If the contact resistance increases, a conduction state in the transparent conductive film is uneven with the enlargement of the transparent panel heater. As a result, heat is unevenly generated, and the transparent panel heater is not uniformly heated on the whole. In addition, current is concentrated in the vicinity of the contacts of the electrodes, so that portions of the transparent panel heater in the vicinity of the electrodes are abnormally heated and a problem such as disconnection tends to inconveniently occur. In the case of such electrodes as disclosed in the above-mentioned Japanese Patent Application Laid-open No. 289685/1992, the unevenness of the conduction state can be solved, but adhesive properties between the transparent conductive film and the electrodes are poor and both of them are liable to peel from each other during use. In addition, a manufacturing process for the formation of such electrodes is intricate and their workability is low, which increases the cost of products.

The present inventors have disclosed, in U.S. patent application Ser. No. 08/099,445 (European Patent Application No. 93306118.6, European Publication No. 0582457), that a transparent panel heater can be provided by forming a substantially light-transmittable metallic thin film on a transparent conductive film, and then forming metallic electrodes on the metallic thin film by a wet process. This invention is an effective invention which can provide a transparent panel heater, but in a treatment for the formation of the metallic electrodes of the transparent panel heater by the wet process, skill has been required.

SUMMARY OF THE INVENTION

An object of the present invention is to provide a transparent panel heater which has electrodes that do not use any conductive printing material and which permits an improved process for forming the electrodes on a transparent conductive film and preventing damage to the transparent conductive film in forming metallic electrodes even in a wet process and which can be manufactured with a high productivity.

Another object of the present invention is to provide a method for manufacturing a transparent panel heater in which electrodes can be formed without using any conductive printing material and in which productivity can be improved.

Still another object of the present invention is to provide a transparent laminate for use in the transparent panel heater.

The above-mentioned objects of the present invention can be achieved by a transparent panel heater having a transparent conductive film which is formed on a transparent substrate and which can be used as a heating surface, and a pair of metallic electrodes for electrifying the transparent conductive film; said transparent panel heater comprising: an acid-resistant transparent protective film formed on the transparent conductive film and a substantially light-transmittable metallic electrode-underlying-layer formed on the transparent protective film, said metallic electrodes being formed on the electrode-underlying-layer.

The object of the present invention can be also achieved by a transparent panel heater having a transparent conductive film which is formed on a transparent substrate and which can be used as a heating surface, and a pair of metallic electrodes for electrifying the transparent conductive film; said transparent panel heater comprising: a substantially light-transmittable metallic electrode-underlying-layer formed on the transparent conductive film, said transparent conductive film being a laminate of at least one transparent thin layer made of a nitride and/or a carbide and at least one substantially light-transmittable metallic layer, said metallic electrodes being formed on the electrode-underlying-layer.

Another object of the present invention can be achieved by a method for manufacturing a transparent panel heater having a transparent conductive film which is formed on a transparent substrate and which can be used as a heating surface, and a pair of metallic electrodes for electrifying the transparent conductive film; said method for manufacturing the transparent panel heater comprising: a first step of forming, by a dry process, an acid-resistant transparent protective film which is insoluble in an acidic solution having a pH of 5 or less, preferably a pH of 3 or less, more preferably a pH of 1 or less, on the transparent conductive film formed on the transparent substrate; a second step of depositing a metal or an alloy on the transparent conductive film by the dry process to form a substantially light-transmittable electrode-underlying-layer thereon; a third step of forming a first transparent resin protective layer on an area other than a place where the metallic electrodes are formed; and a fourth step of forming the metallic electrodes on the electrode-underlying-layer by a wet plating process.

The method of the present invention can be also achieved by a method for manufacturing a transparent panel heater having a transparent conductive film which is formed on a transparent substrate and which can be used as a heating surface, and a pair of metallic electrodes for electrifying the transparent conductive film; said method for manufacturing the transparent panel heater comprising: a first step of forming, on the transparent substrate by a dry process, the transparent conductive film comprising a laminate of at least one transparent thin layer made of a nitride and/or a carbide, and at least one substantially light-transmittable metallic layer; a second step of depositing a metal or an alloy on the transparent conductive film by the dry process to form a substantially light-transmittable electrode-underlying-layer thereon; a third step of forming a first transparent resin protective layer on an area other than a place where the metallic electrodes are formed; and a fourth step of forming the metallic electrodes on the electrode-underlying-layer by a wet plating process.

Other objects of the present invention can be achieved by a transparent laminate obtained by laminating a transparent thin layer made of a nitride and/or a carbide and a substantially light-transmittable metallic layer on at least one side of a transparent substrate.

In the transparent panel heater of the present invention, the electrode-underlying-layer and the acid-resistant transparent protective film are usually formed by a dry process, and the metallic electrodes are usually formed by a wet process. In the present invention, the dry process means a process for forming a film in a solution-free atmosphere, and examples of the dry process include physical deposition methods such as a vacuum vapor deposition method, an ion plating method, a sputtering method and a molecular beam epitaxy (MBE) as well as chemical deposition methods such as a CVD method, an MOCVD method and a plasma CVD method. Furthermore, the wet process means a process for forming a film in a solution, and particularly, it denotes electroplating or electroless plating (chemical plating) which is wet plating.

As the transparent substrate which can be used in the present invention, there can be used a glass or a transparent plastic film having a light transmission of 70% or more, preferably 80% or more in a visible light range having a wavelength of from 400 nm to 800 nm. From the viewpoints of thinness, flexibility, impact resistance and continuous productivity, the plastic film can be preferably used as the transparent substrate.

Preferable examples of a plastic material of the film constituting the transparent substrate include polyesters such as polyethylene terephthalate (PET) and polyethylene naphthalate (PEN), polyamide, polyether, polysulfone, polyethersulfone (PES), polycarbonate, polyarylate, polyether imide, polyether ether ketone (PEEK), polyimide and aramid.

The thickness of the plastic film which can be used as the transparent substrate is usually in the range of from 5 μm to 500 μm, preferably from 10 μm to 200 μm, more preferably from 50 μm to 150 μm.

As the transparent conductive film which can be used in the present invention, there can be used (1) a compound semiconductor layer of tin oxide, indium oxide or the like, (2) a metallic layer comprising a simple substance of gold, silver, copper, palladium or the like, or an alloy thereof, and (3) a laminate of a sandwiched structure of a metallic layer comprising a metal such as gold, silver, copper, palladium or the like, or an alloy thereof and a thin film having a high refractive index with a refractive index of 1.8 or more, preferably 2.0 or more, of indium oxide, titanium oxide or the like. The thickness of each of these layers is basically in the range of from 1 nm to 500 nm, preferably from 5 nm to 50 nm, more preferably from 10 nm to 30 nm. Particularly in the case of the laminate structure, the thickness of the metallic layer is in the range of from 1 nm to 100 nm, preferably from 5 nm to 50 nm, more preferably 10 nm to 30 nm. From the viewpoints of transparency and conductivity, the laminate structure (3) is desirable. Here, as the metallic layer, a thin film mainly comprising silver is preferable, silver only is more preferable and also in the case of silver alloy, and the content of silver is 30% by weight or more, preferably 40% by weight or more, more preferably 50% by weight or more. Needless to say, even the metallic layer in which the silver content falls off from the above-mentioned range is also usable in a certain case. In addition, the metallic layer may be formed of a laminate of the thin layer mainly comprising silver and a thin layer comprising another metal.

As an example of the laminate which is preferable from the viewpoint of acid resistance at the time of plating, there is a laminate in which the metallic layer, particularly the silver thin layer is sandwiched between transparent thin layers made of a nitride and/or a carbide. When the transparent thin layer is made of the nitride and/or the carbide having acid resistance, it can be omitted to form the acid-resistant transparent protective film on the transparent conductive film. In this case, in order to prevent the transparent conductive film from deteriorating owing to electrification, it is preferable to add a metal such as gold, copper palladium platinum or tungsten to the silver thin film, so long as conductivity and transparency are not impaired. In addition, a thin film of a metal other than silver may be laminated on the silver thin layer. The plural transparent thin layers and metallic layers can be alternately mutually laminated. The transparent thin layers made of the nitride and/or the carbide may be partially oxidized or hydrogenated, so long as transparency and acid resistance are not impaired. If neither the nitride nor the carbide is used in the transparent conductive film, the acid-resistant transparent protective film should be interposed between the transparent conductive film and the electrode-underlying-layer which is an underlying layer for the metallic electrodes.

The above-mentioned transparent thin layer will be further described in more detail. As this transparent thin layer, any layer is acceptable, so long as it is a protective layer capable of withstanding a solution having a pH of 5 or less, preferably a pH of 3 or less, more preferably a pH of 1 or less which is used at the time of a plating treatment. Examples of the transparent thin layer include layers made of aluminum nitride, indium nitride, gallium nitride, silicon nitride, tin nitride, boron nitride, silicon carbide, amorphous carbon, diamond-like carbon, tin oxide, titanium oxide, and aluminum oxide and the transparent thin film having a high refractive index with a refractive index of 1.8 or more, preferably 2.0 or more which comprises the nitride and/or the carbide is preferable. In this case, the transparent thin film may be partially oxidized or hydrogenated.

Examples of the partially oxidized transparent thin layer include aluminum oxynitride, indium oxynitride, gallium oxynitride, silicon oxynitride, tin oxynitride, boron oxynitride and silicon oxynitride carbide. In each of these oxynitrides, the content of nitrogen in the components except the metal and carbon is preferably 30 atom % or more, more preferably 50 atom % or more.

Examples of the partially hydrogenated transparent thin layer include aluminum hydride nitride, indium hydride nitride, gallium hydride nitride, silicon hydride nitride, tin hydride nitride, boron hydride nitride and silicon hydride nitride carbide. In each of these hydride nitrides, the content of nitrogen in the components except the metal and carbon is preferably 50 atom % or more, more preferably 80 atom % or more.

In the present invention, the thickness of the transparent thin layer is usually in the range of from 1 nm to 100 nm, preferably from 5 nm to 50 nm, more preferably from 10 nm to 30 nm.

As a technique for forming the transparent conductive film on the transparent substrate, there can be utilized a known method such as a spray method, a coating method or a physical deposition method. Here, the physical deposition method is a technique for forming a thin film of a metal or the like under reduced pressure or under vacuum, and examples of the physical deposition method include a vacuum deposition method, a sputtering method, an ion plating method, an ion beam assisting deposition method and an ion cluster beam method. In the case that the transparent conductive film comprises the laminate, it is preferable to use a formation method using ions or a plasma such as the sputtering method, the ion plating method, the ion beam assisting deposition method and the ion cluster beam method.

As materials for the electrode-underlying-layer which can be used in the present invention, there can be used a metal such as copper, nickel, palladium, chromium, gold, silver, lead or platinum or an alloy thereof.

The electrode-underlying-layer is formed on the transparent conductive film or the acid-resistant transparent protective film by a selected dry process in which deposited particles directly or indirectly get energy from an electromagnetic field. Here, directly getting the energy means that ions are accelerated by power in the electromagnetic field to get the energy. Indirectly getting the energy means that the ions get the energy via a collision step from particles which have directly received the energy. The energy which the deposited particles get in the above-mentioned process is preferably in the range of from 0.5 eV to 100 eV, more preferably from 1 eV to 50 eV. If the energy which the deposited particles get is less than 0.5 eV, the adhesive force of the electrode-underlying-layer is not sufficient in many cases, and if it is more than 100 eV, the thin film is excessively sputtered with the deposited particles. In this connection, the particles not having the energy in the above-mentioned range may be present as much as several percent to several tens percent in the deposited particles for forming the electrode-underlying-layer. Typical examples of a technique for forming the electrode-underlying-layer include a vacuum vapor deposition method, a sputtering method, an ion plating method, an ion beam assisting deposition method, an ion cluster beam method and an ion deposition thin film formation method.

The electrode-underlying-layer is suitably formed in the state of a uniform continuous layer on the transparent conductive film or the acid-resistant transparent protective film, but it may be formed in the form of an island on the transparent conductive film, or locally on the transparent conductive film or the acid-resistant transparent protective film.

The thickness of the electrode-underlying-layer is preferably in the range of from 0.5 nm to 20 nm. If the thickness is less than 0.5 nm, the thickness of the electrodes formed by a plating treatment is apt to be nonuniform. If it is more than 20 nm, visible light transmission noticeably deteriorates, so that the light transmission of the transparent panel heater is impaired, which is unsuitable for the objects of the present invention.

In the transparent panel heater of the present invention, when the acid-resistant transparent protective film is interposed between the transparent conductive film and the electrode-underlying-layer, this acid-resistant transparent protective film should have a light transmission of 60% or more, preferably 70% or more, more preferably 80% or more at a wavelength of 550 nm and withstand a solution having a pH of 5 or less, preferably a pH of 3 or less, more preferably a pH of 1 or less which is used at the time of the plating treatment. Examples of the material for such a transparent protective film include aluminum nitride, indium nitride, gallium nitride, silicon nitride, tin nitride, boron nitride, silicon carbide, amorphous carbon, diamond carbon, tin oxide, titanium oxide and aluminum oxide and the transparent thin film having a high refractive index with a refractive index of 1.8 or more, preferably 2.0 or more which comprises the nitride and/or the carbide is preferable. In the present invention, the thickness of the acid-resistant transparent protective film is in the range of from 1 nm to 100 nm, preferably from 5 nm to 50 nm, more preferably from 10 nm to 30 nm.

In the transparent panel heater of the present invention, when a laminate of at least one transparent thin film made of the nitride and/or the carbide and at least one metallic layer is used as the transparent conductive film, an intermediate layer can be interposed between the transparent conductive film and the electrode-underlying-layer for the purpose of further improving the adhesive properties of the transparent conductive film to the metallic electrodes formed by the wet process. Preferable examples of a material for the intermediate layer of the present invention include metal oxides such as zinc oxide, tin oxide, aluminum oxide, indium oxide and indium tin oxide (ITO). The thickness of the intermediate layer is usually from 1 nm to 100 nm, preferably 5 nm to 50 nm, more preferably from 10 nm to 20 nm.

In the present invention, as the first transparent resin protective layer, any protective layer is acceptable, so long as it has a light transmission of 70% or more, preferably 80% or more at a wavelength of 550 nm and it withstands the plating treatment. Examples of such a first transparent resin protective layer include layers obtained by applying and then curing an ultra-violet setting resin, an electron beam-setting resin, a thermosetting resin, and a known UV-setting resist ink, an electron beam-setting resist ink and a thermo-setting resist ink, and a dry film. In addition, other materials can also be used as the first transparent resin protective layer.

if they can provide the water-resistant and chemical-resistant transparent films. For example, a transparent coating material, a curable monomer or oligomer, a plastic film such as a polyester onto which an adhesive is applied, or a self-adhesive film of an ethylene-vinyl acetate copolymer or the like can also be laminated to form the first transparent resin protective layer. The above mentioned resin or film can be also used in combination thereof or mixture thereof as the first transparent resin protective layer. The thickness of the first transparent resin protective layer is usually in the range of from 1 µm to 100 µm, preferably from 5 µm to 50 µm, more preferably from 10 µm to 30 µm.

As a material for the metallic electrodes which can be used in the present invention, any metal can be used, so long as it can be deposited by the plating. Nevertheless, from the viewpoints of electrical properties and durability, the electrodes preferably comprise a single layer or a laminate of at least one metal selected from the group consisting of copper, silver, gold, nickel, chromium, tin, lead and solder, or an alloy of these metals. The thickness of the electrodes should be such as to permit the flow of current under which the transparent conductive film can function as a heating surface, and it is preferably 0.5 µm or more. As described above, this metallic electrodes can usually be formed by electroplating or electroless plating, and the electroplating and the electroless plating may be used together.

Furthermore, for the sake of the mechanical protection of the electrodes and the first transparent resin protective layer as well as chemical protection from corrosion by moisture and the like, it is preferable to provide a second transparent resin protective layer so as to cover the metallic electrodes and the first transparent resin protective layer. For the second transparent resin protective layer, there can be used a material having a light transmission of at least 70%, preferably 80% or more at a wavelength of 550 nm. The second transparent resin protective layer can be formed by laminating the same kind of plastic film as the transparent substrate with the aid of an adhesive, or applying an organic material such as a polyester, a polyolefin or an acrylic resin, or a silicone-based hard coating material. Or a silica sol material having a similar function may also be used. In the case that the plastic film is used as the second transparent resin protective layer, a usual transparent sticky agent or adhesive can be used. Preferable examples of the adhesive include acrylic pressure-sensitive adhesives and cyanoacrylate-based reactive adhesives. The thickness of the second transparent resin protective layer is usually in the range of from 1 µm to 200 µm, preferably from 2 µm to 100 µm, more preferably from 5 µm to 50 µm.

When it is required that the transparent panel heater of the present invention is stuck on a support, an adhesive layer can be formed on the surface of the transparent substrate or the second transparent resin protective layer. For this adhesive layer, a usual transparent viscous material or adhesive can be used. Preferable examples of the adhesive include acrylic pressure-sensitive adhesives and cyanoacrylate-based reactive adhesives. If necessary, a separator (or a release paper) can be put on each adhesive surface to suitably prevent the adhesive surface from adhering to another member, when products are transported. As the separator or release paper, a polypropylene film and a polyester film can be used. The thickness of the separator is usually in the range of from 1 µm to 200 µm, preferably from 2 µm to 100 µm, more preferably from 5 µm to 50 µm.

The transparent laminate of the present invention can be applied not only as a transparent conductive film for the transparent panel heater but also as an electromagnetic shield material and a heat ray reflective film for a window by the utilization of its conductivity and optical properties. When the transparent laminate is used as the electromagnetic shield material, the metallic electrodes formed for the transparent panel heater of the present invention can be used as electrodes for grounding. As a transparent thin layer and a metallic layer which are used in this transparent laminate, the exemplified transparent thin layer and metallic layer in the above-mentioned transparent panel heater can be directly used.

The transparent laminate of the present invention is not limited to a laminate in which one transparent thin layer made of the nitride and/or the carbide and one metallic layer are laminated on one surface of the transparent substrate. Examples of the transparent laminate of the present invention include a laminate formed by depositing three layers of the transparent thin layer, the metallic layer and the transparent thin layer on the transparent substrate; a laminate formed by depositing five layers of the transparent thin layer, the metallic layer, the transparent thin layer, the metallic layer and the transparent thin layer on the transparent substrate; and a laminate formed by depositing seven layers of the transparent thin layer, the metallic layer, the transparent thin layer, the metallic layer, the transparent thin layer, the metallic layer and the transparent thin layer on the transparent substrate.

The above and other objects, features and advantages of the present invention will be apparent from the following description referring to the accompanying drawings which will illustrate examples of the preferred embodiments of the present invention.

DETAILED DESCRIPTION OF THE INVENTION

Figure 1:
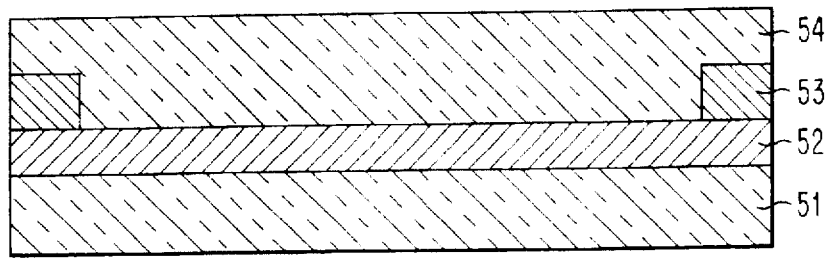
FIG. 1 is a sectional view of a conventional transparent panel heater.
Figure 2:
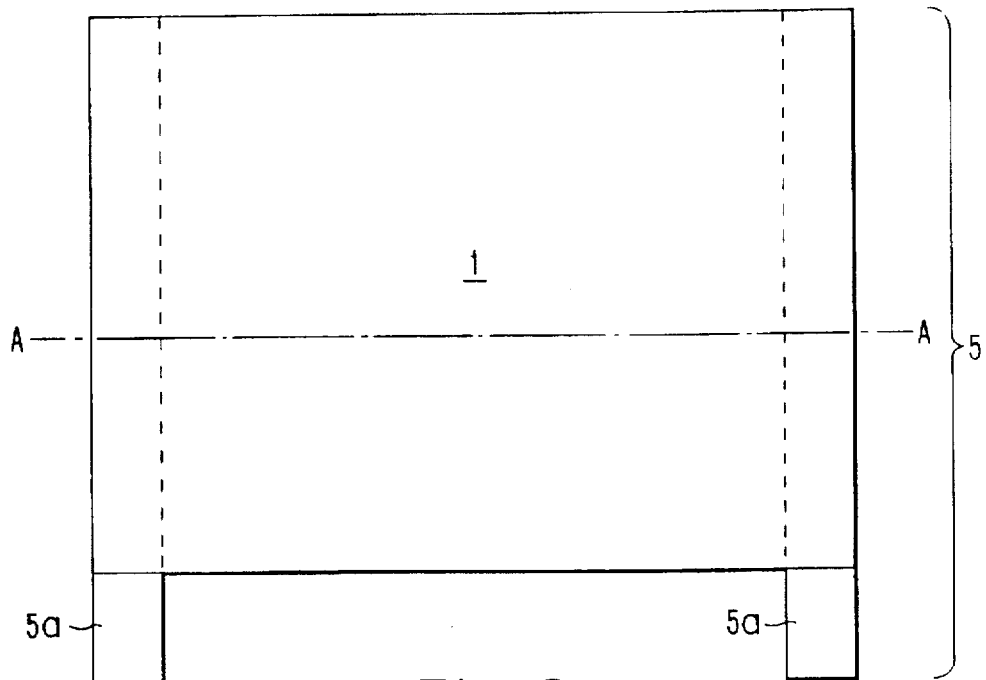
FIG. 2 is a plan view illustrating one embodiment of a transparent panel heater according to the present invention.
Figure 3A:
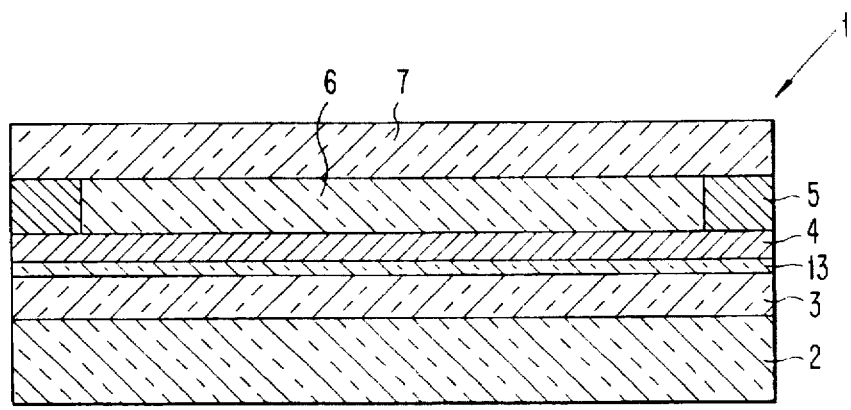
FIGS. 3a and 3b each is a sectional view along the A—A line in FIG. 2.
Figure 4:
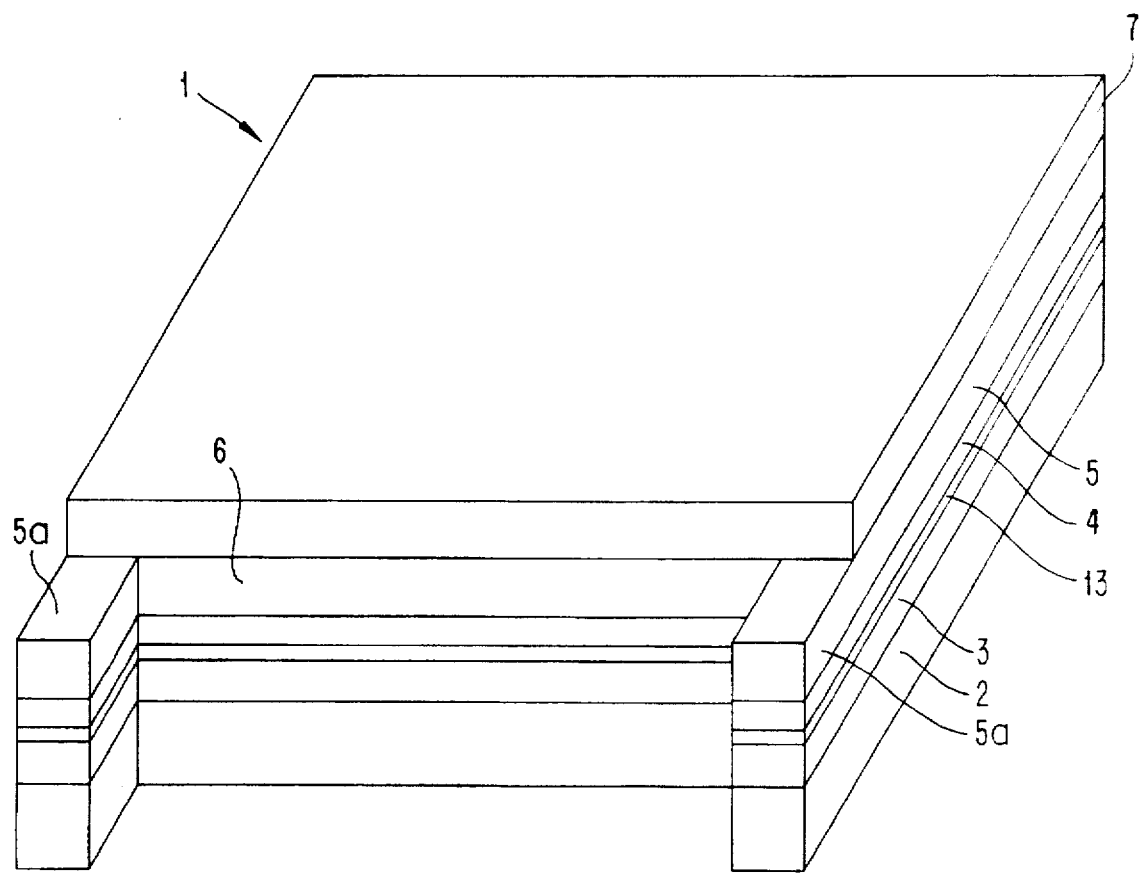
FIG. 4 is a perspective view of the transparent panel heater shown in FIG. 2.

The present invention will be described in more detail. A transparent panel heater 1 shown in FIGS. 2, 3a and 4 has the form of a substantially rectangular plate. This heater is constituted of a transparent substrate 2 made of a plastic or the like, a transparent conductive film 3, an acid-resistant transparent protective film 13, an electrode-underlying-layer 4, a pair of metallic electrodes 5 formed on the electrode-underlying-layer 4 and at both end portions of the heater 1 so as to electrify the transparent conductive film 3, a first transparent resin protective layer 6 for covering a portion on the surface of the electrode-underlying-layer 4 where the metallic electrodes 5 are not formed, and a second transparent resin protective layer 7 for covering the metallic electrodes 5 and the first transparent resin protective layer 6 successively laminated on the surface of the transparent substrate 2. The transparent protective film 13 is made of an acid-resistant material such as a carbide and/or a nitride. Furthermore, the thickness of the electrode-underlying-layer 4 is decided so as to substantially have light-transmission. The metallic electrodes 5 have a long and narrow shape, and one end of each electrode constitutes a connecting portion 5a. The connecting portion 5a is a portion to which an electric wire for applying voltage to the electrode 5 is connected, and the second resin protective layer 7 is not disposed on the connecting portions 5a. As shown in FIGS. 2 and 4, the connecting portions 5a are protruded from the heater 1 itself to a direction in its surface.

The electrode-underlying-layer 4 is formed on the transparent conductive film 3 by a method selected from dry processes using deposition particles with the energy of a specific value or more, preferably 1 eV or more. The thickness of the electrode-underlying-layer 4 is, for example, from 0.5 nm to 20 nm. The metallic electrodes 5 are formed on the surface of the electrode-underlying-layer 4 by a method selected from wet processes such as electroless plating and electroplating, after the first transparent resin protective layer 6 has been formed on the surface of the electrode-underlying-layer 4 except positions where the electrodes 5 are formed. The second transparent resin protective layer 7, which is disposed for the mechanical and chemical protection of the electrodes 5 and the transparent conductive film 3, is made of a resin or a film having a visible light transmission of, e.g., 70% or more.

According to the transparent panel heater of the present invention which is constituted as described above, the electrode layers comprising a metal can be substantially directly formed on the transparent conductive film without damaging the transparent conductive film, and therefore electrical connection between the electrodes and the transparent conductive film is good. In consequence, the connection resistance between both of them is low, so that performance as the heater is improved and reliability is also remarkably heightened. Furthermore, a first transparent resin protective layer determines positions where the metallic electrodes should be formed, and protects the transparent conductive film, whereby operating efficiency at the time of the manufacture of the transparent panel heater can also be remarkably enhanced.

Figure 3B:
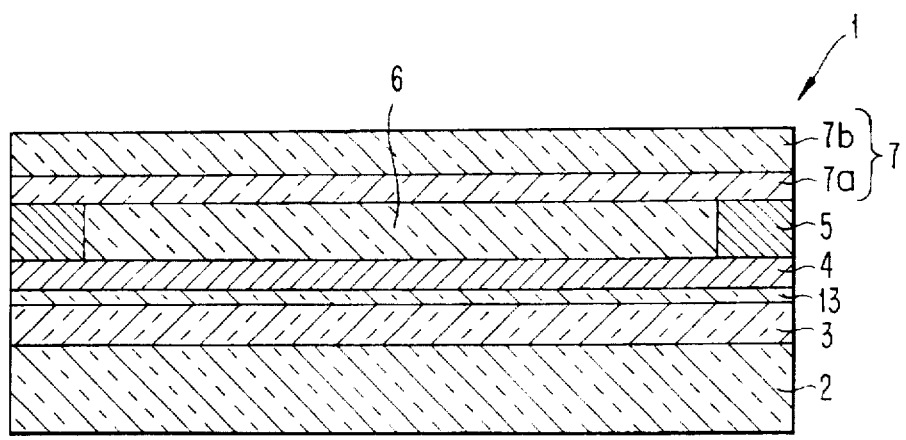

FIG. 3b shows a section of one variant of the transparent panel heater in this embodiment. In this transparent panel heater, the second transparent resin protective layer 7 comprises a laminate of an adhesive layer 7a and a plastic film 7b. This plastic film 7b is formed on the metallic electrodes 5 and the first transparent resin protective layer 6 via the adhesive layer 7a.

Figure 5:
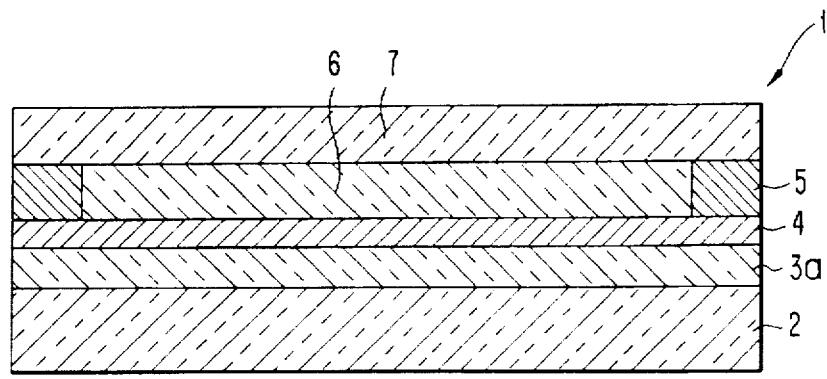
FIG. 5 is a sectional view illustrating another embodiment of the transparent panel heater according to the present invention.
Figure 6:
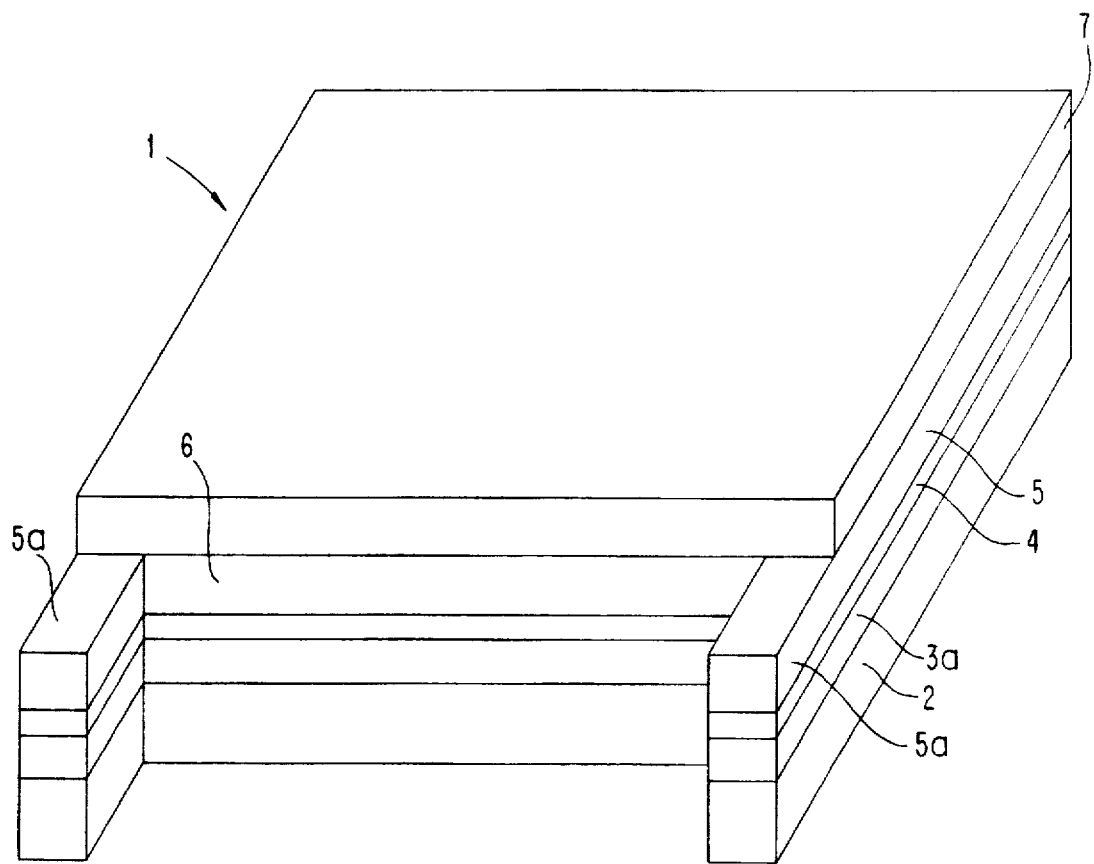
FIG. 6 is a perspective view of the transparent panel heater shown in FIG. 5.
Figure 7:
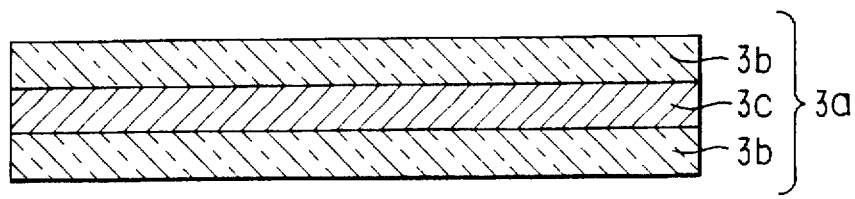
FIG. 7 is a sectional view illustrating one constitutional example of a transparent conductive film of the transparent panel heater shown in FIG. 5.

FIGS. 5 to 7 show another embodiment of the transparent panel heater of the present invention. In FIGS. 5 to 7, the same members as shown in FIGS. 2 to 4 are represented by the same reference numerals. This transparent panel heater is different from the above-mentioned transparent panel heater in that any acid-resistant transparent protective film is not interposed between the transparent conductive film and the electrode-underlying-layer. Instead, the transparent conductive film 3a comprises a laminate of at least one substantially light-transmittable metallic layer and at least one transparent thin layer made of the nitride and/or the carbide. In an example shown in FIG. 7, the transparent conductive film 3a comprises the three layers of a transparent thin layer 3b, a metallic layer 3c and a transparent thin layer 3b.

Figure 8A:
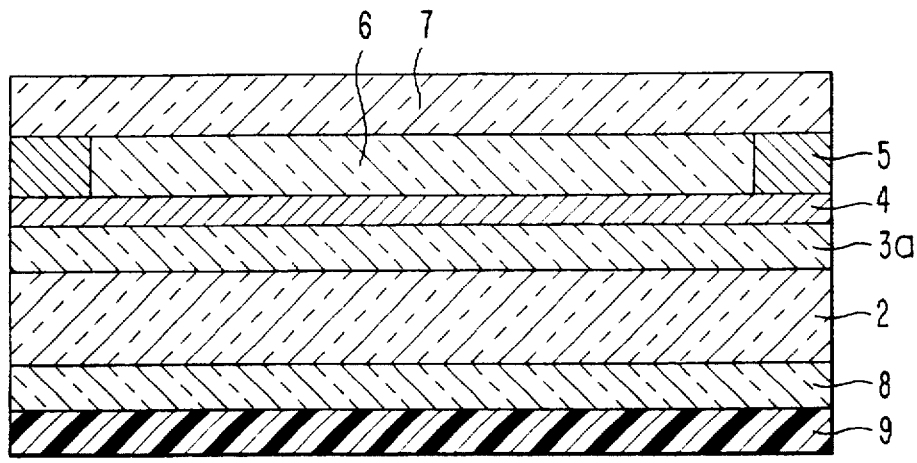
FIGS. 8a and 8b each is a sectional view illustrating still another embodiment of a transparent panel heater according to the present invention.
Figure 8B:
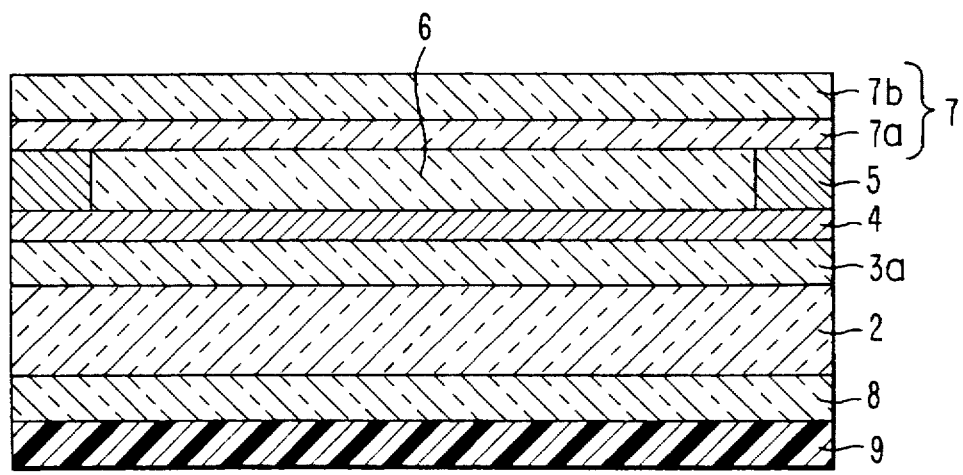
Figure 9:
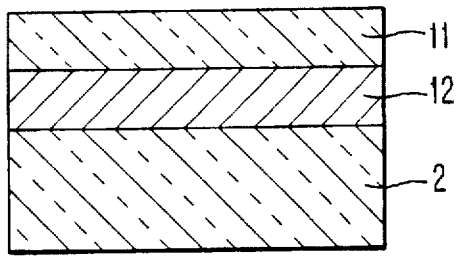
FIG. 9 is a sectional view illustrating the first embodiment of a transparent laminate according to the present invention.

Furthermore, it is also possible to form an adhesive layer by which the transparent panel heater is attached to another support. FIGS. 8a and 8b each shows a constitution having an adhesive layer 8, and FIG. 8a shows a case where the second transparent resin protective layer comprises a single layer and FIG. 8b shows a case where the second transparent resin protective layer 7 comprises a laminate structure of the adhesive layer 7a and the plastic film 7b and this plastic film 7b is formed on the metallic electrodes 5 and the first transparent resin protective layer 6 via the adhesive layer 7a. The adhesive layer 8 is formed on the surface of the transparent substrate 2 opposite to the side of the transparent conductive film 3a, and on the surface of the adhesive layer 8, there is put a separator 9 for preventing the adhesive layer 8 from adhering to another member at the time of transportation. Needless to say, the separator 9 is released/removed, when this transparent panel heater is actually attached to the support.

Figure 10:
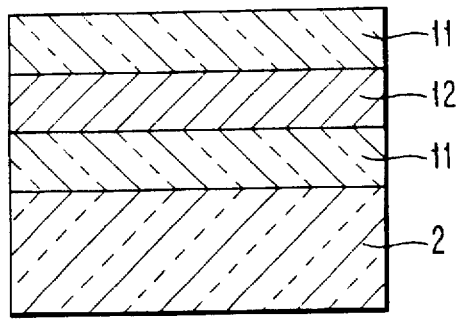
FIG. 10 is a sectional view illustrating the second embodiment of the transparent laminate according to the present invention.
Figure 11:
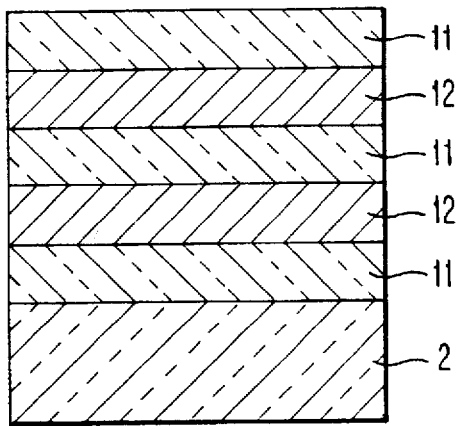
FIG. 11 is a sectional view illustrating the third embodiment of the transparent laminate according to the present invention.
Figure 12:
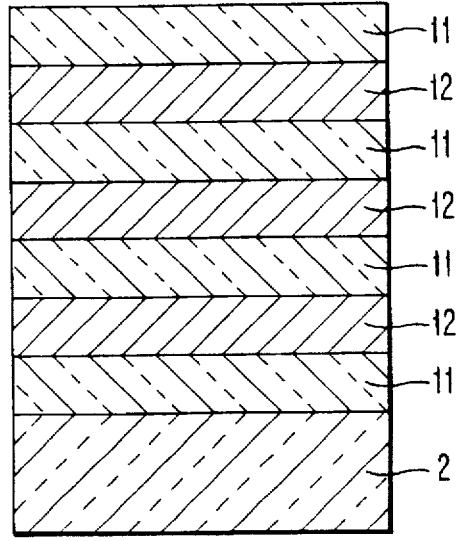
FIG. 12 is a sectional view illustrating the fourth embodiment of the transparent laminate according to the present invention.

Next, transparent laminates will be described in reference to FIGS. 9 to 12. Each of these transparent laminates is a laminate obtained by laminating on the transparent substrate 2, at least one transparent thin layer 11 made of the nitride and/or the carbide and at least one substantially light-transmittable metallic thin layer 12, and this laminate is substantially transparent. In the laminate shown in FIG. 9, one metallic layer 12 and one transparent thin layer 11 are laminated in this order on the transparent substrate 2. In FIG. 10, three layers of the transparent thin layer 11, the metallic layer 12 and the transparent thin layer 11 are formed on the transparent substrate 2. In FIG. 11, five layers of the transparent thin layer 11, the metallic layer 12, the transparent thin layer 11, the metallic layer 12 and the transparent thin layer 11 are formed on the transparent substrate 2. In FIG. 12, seven layers of the transparent thin layer 11, the metallic layer 12, the transparent thin layer 11, the metallic layer 12, the transparent thin layer 11, the metallic layer 12 and the transparent thin layer 11 are formed on the transparent substrate 2.

Next, some embodiments of the present invention will be described in more detail in reference to examples. However, the scope of the present invention should not be limited to these examples.

EXAMPLE 1

A laminated film comprising indium oxide (thickness=40 nm), silver (thickness=12 nm) and indium oxide (thickness=40 nm) was deposited on a polyethylene terephthalate (PET) film having a visible light transmission of 89% and a thickness of 100 µm by a DC magnetron sputtering process to form a transparent conductive film. Furthermore, an acid-resistant transparent protective film having a thickness of 10 nm and comprising silicon nitride was formed on the thus formed transparent conductive film by the DC magnetron sputtering process, and an electrode-underlying-layer comprising copper and having a thickness of 2 nm was further deposited thereon by the same process to form a laminate.

11

Onto the electrode-underlying-layer of the thus obtained laminate except for portions reserved for the formation of electrodes, an ultraviolet (UV)-setting transparent polyol acrylate was applied and then cured to form a first transparent resin protective layer having a thickness of 10 µm. Afterward, this laminate was immersed in an aqueous acid solution of pH 2, and electroplating was then carried out in a nickel sulfamate plating bath at pH 4.5 to form nickel films having a thickness of 20 µm as metallic electrodes. The size of the metallic electrodes was 125 mm (length)×4 mm (width), and the distance between the electrodes was 90 mm. Next, a 25-µm-thick PET film with a 20-µm-thick adhesive layer was further laminated on the metallic electrodes and the first transparent resin protective layer except the connecting portions of the metallic electrodes, to form a second transparent resin protective layer. Thus, a transparent panel heater constituted as shown in FIGS. 2 to 4 was completed.

The resistance between both the electrodes of the thus obtained transparent panel heater was 5Ω. This transparent panel heater was placed in a thermostatic tank at −20° C. and then allowed to stand. Afterward, a voltage of 13 V was applied thereto, and as a result, the surface temperature of the transparent panel heater rose up to +2° C. in one minute. That is, a temperature rise of 22° C. took place.

EXAMPLE 2

Indium tin oxide (ITO) (thickness=350 nm) was deposited on a PET film having a visible light transmission of 89% and a thickness of 100 µm by a DC magnetron sputtering process to form a transparent conductive film having a visible light transmission of 75% and a surface resistance of 30Ω/☐. Furthermore, an acid-resistant transparent protective film having a thickness of 10 nm and comprising silicon nitride was formed on the thus formed transparent conductive film by the DC magnetron sputtering process, and an electrode-underlying-layer comprising copper and having a thickness of 2 nm was further deposited thereon by the same process to form a laminate.

Onto the electrode-underlying-layer of the thus obtained laminate except for portions reserved for the formation of electrodes, a UV-setting transparent urethane acrylate was applied and then cured to form a first transparent resin protective layer. Afterward, this laminate was immersed in an aqueous acid solution of pH 2, and electroplating was then carried out in a nickel sulfamate plating bath at pH 4.5 to form nickel films having a thickness of 20 µm as metallic electrodes, whereby a transparent panel heater was completed. Electrification was given between both the metallic electrodes of the thus obtained transparent panel heater, and as a result, heat generation was confirmed.

EXAMPLE 3

A laminated film comprising silicon nitride (thickness=30 nm), silver (thickness=12 nm) and silicon nitride (thickness=30 nm) was deposited on a PET film having a visible light transmission of 89% and a thickness of 100 µm by a DC magnetron sputtering process to form a transparent conductive film having a visible light transmission of 81%, a surface resistance of 7Ω/☐ and an infrared reflectance of 90%. Next, an electrode-underlying-layer comprising copper and having a thickness of 2 nm was further deposited on this transparent conductive film to form a laminate.

Onto the electrode-underlying-layer of the thus obtained laminate except for portions reserved for the formation of electrodes, a UV-setting transparent polyol acrylate was applied and then cured to form a first transparent resin

12 protective layer. Afterward, this laminate was immersed in an aqueous acid solution of pH 2, and electroplating was then carried out in a nickel sulfamate plating bath at pH 4.5 to form nickel films having a thickness of 20 µm as metallic electrodes. The size of the metallic electrodes was 125 mm (length)×4 mm (width), and the distance between the electrodes was 90 mm. Next, a 25-µm-thick PET film with a 20-µm-thick adhesive layer was further laminated on the metallic electrodes and the first transparent resin protective layer except the connecting portions of the metallic electrodes, to form a second transparent resin protective layer. Thus, a transparent panel heater constituted as shown in FIGS. 5 to 7 was completed.

The resistance between both the electrodes of the thus obtained transparent panel heater was 5Ω. This transparent panel heater was placed in a thermostatic tank at −20° C. and then allowed to stand. Afterward, a voltage of 13 V was applied thereto, and as a result, the surface temperature of the transparent panel heater rose up to +2° C. in one minute. That is, a temperature rise of 22° C. took place.

EXAMPLE 4

A laminated film comprising silicon nitride (thickness=30 nm), silver (thickness=10 nm), copper (thickness=5 nm) and silicon nitride (thickness=10 nm) was deposited on a PET film having a visible light transmission of 89% and a thickness of 100 µm by a DC magnetron sputtering process, and an intermediate layer comprising indium oxide (thickness=20 nm) was then formed for the purpose of improving wettability at the time of plating. Afterward, an electrode-underlying-layer comprising palladium and having a thickness of 2 nm was further deposited by the DC magnetron sputtering process to form a laminate.

Onto the electrode-underlying-layer of the thus obtained laminate except for portions reserved for the formation of electrodes, a UV-setting transparent polyurethane acrylate was applied and then cured to form a first transparent resin protective layer. Afterward, this laminate was immersed in an aqueous acid solution of pH 1, and electroplating was then carried out in an alkanol sulfonate bath to form solder films comprising a tin-lead alloy and having a thickness of about 10 µm as metallic electrodes. The size of the metallic electrodes was 125 mm (length)×4 mm (width), and the distance between the electrodes was 90 mm. Next, a 50-µm-thick PET film with a 20-µm-thick adhesive layer was laminated on the first transparent resin protective layer and the electrodes except the connecting portions of the metallic electrodes, to form a second transparent resin protective layer. Thus, a transparent panel heater was completed.

The resistance between both the electrodes of the thus obtained transparent panel heater was 6Ω. This transparent panel heater was placed in a thermostatic tank at −20° C. and then allowed to stand. Afterward, a voltage of 13 V was applied thereto, and as a result, the surface temperature of the transparent panel heater rose up to +1° C. in one minute.

EXAMPLE 5

A laminated film comprising indium oxynitride (thickness=30 nm), silver (thickness=13 nm) and silicon oxynitride (thickness=30 nm) was deposited on a PET film having a visible light transmission of 89% and a thickness of 100 µm by a radiofrequency (rf) magnetron sputtering process to form a transparent conductive film. Next, an electrode-underlying-layer comprising copper and having a thickness of 2 nm was further formed thereon by a DC magnetron sputtering process.

Onto the electrode-underlying-layer of the thus obtained laminate except for portions reserved for the formation of electrodes, a UV-setting transparent epoxy acrylate was applied and then cured to form a first transparent resin protective layer. Afterward, this laminate was immersed in an aqueous acid solution of pH 1, and electroplating was then carried out in a nickel sulfamate plating bath at pH 4.5 to form nickel films having a thickness of 20 μm as metallic electrodes. The size of the metallic electrodes was 125 mm (length)×4 mm (width), and the distance between the electrodes was 90 mm. Next, a 25-μm-thick PET film with a 20-μm-thick adhesive layer was laminated on the first transparent resin protective layer and the electrodes except the connecting portions of the metallic electrodes, to form a second transparent resin protective layer. Afterward, an adhesive layer with a release sheet was formed under the transparent substrate. Thus, a transparent panel heater constituted as shown in FIG. 8 was completed.

The resistance between both the electrodes of the thus obtained transparent panel heater was 5Ω. This transparent panel heater was adhered on a glass plate, and the transparent panel heater with the glass plate was placed in a thermostatic tank at −20° C. and then allowed to stand. Afterward, a voltage of 13 V was applied thereto, and as a result, the surface temperature of the transparent panel heater rose up to +2° C. in one minute. That is, a temperature rise of 22° C. took place.

EXAMPLE 6

A laminated film comprising indium oxide (thickness=40 nm), a metallic layer comprising silver+3% by weight of gold (thickness=10 nm) and silicon carbide nitride (thickness=30 nm) was deposited on one surface of a polyether sulfone (PES) film having a visible light transmission of 88% and a thickness of 100 μm by a high-frequency ion plating process, and an electrode-underlying-layer comprising palladium and having a thickness of 2 nm and was further formed thereon by the same process.

Onto the electrode-underlying-layer of the thus obtained laminate except for portions reserved for the formation of electrodes, a UV-setting acrylic resin resist ink was applied and then cured to form a first transparent resin protective layer. Afterward, this laminate was immersed in an aqueous acid solution of pH 1, and electroplating was then carried out in a nickel sulfamate plating bath at pH 3.5 to form nickel films having a thickness of 20 μm as metallic electrodes. The size of the metallic electrodes was 35 mm (length)×4 mm (width), and the distance between the electrodes was 90 mm. Next, an acrylic urethane UV-setting resin was applied and then cured on the metallic electrodes and the first transparent resin protective layer except the connecting portions of the metallic electrodes, to form a second transparent resin protective layer, whereby a transparent panel heater was completed.

The resistance between both the electrodes of the thus obtained transparent panel heater was 5Ω. This transparent panel heater was placed in a thermostatic tank at −20° C. and then allowed to stand. Afterward, a voltage of 12 V was applied thereto, and as a result, the surface temperature of the transparent panel heater rose up to +2° C. in one minute. That is, a temperature rise of 22° C. took place.

EXAMPLE 7

A laminated film comprising silicon nitride (thickness=12 nm), copper (thickness=5 nm), silver (thickness=12 nm) and indium nitride (thickness=30 nm) was deposited on a PET film having a visible light transmission of 89% and a thickness of 100 μm by a DC magnetron sputtering process to form a transparent conductive film. Afterward, an electrode-underlying-layer comprising copper and having a thickness of 2 nm was further formed by the DC magnetron sputtering process.

Onto the electrode-underlying-layer of the thus obtained laminate except for portions reserved for the formation of electrodes, a UV-setting acrylic resin resist ink was applied and then cured to form a first transparent resin protective layer. Afterward, this laminate was immersed in an aqueous acid solution of pH 2, and electroplating was then carried out in a nickel sulfamate plating bath at pH 3.5 to form nickel films having a thickness of 20 μm as metallic electrodes. The size of the metallic electrodes was 35 mm (length)×4 mm (width), and the distance between the electrodes was 90 mm. Next, an acrylic urethane resin layer was laminated on the metallic electrodes and the first transparent resin protective layer except the connecting portions of the metallic electrodes, to form a second transparent resin protective layer, whereby a transparent panel heater was completed.

The resistance between both the electrodes of the thus obtained transparent panel heater was 5Ω. This transparent panel heater was placed in a thermostatic tank at −20° C. and then allowed to stand. Afterward, a voltage of 12 V was applied thereto, and as a result, the surface temperature of the transparent panel heater rose up to +2° C. in one minute. That is, a temperature rise of 22° C. took place.

EXAMPLE 8

A laminated film comprising silicon carbide+silicon nitride (thickness=30 nm), silver (thickness=12 nm) and silicon carbide+silicon nitride (thickness=30 nm) was deposited on a PET film having a visible light transmission of 89% and a thickness of 100 μm by a high-frequency magnetron sputtering process to form a transparent conductive film. Next, an electrode-underlying-layer comprising copper and having a thickness of 2 nm was deposited on this transparent conductive film by the same process to form a laminate.

Onto the electrode-underlying-layer of the thus obtained laminate except for portions reserved for the formation of electrodes, a UV-setting transparent resist ink was applied and then cured to form a first transparent resin protective layer. Afterward, this laminate was immersed in an aqueous acid solution of pH 2, and electroplating was then carried out in a nickel sulfamate plating bath at pH 3.5 to form nickel films having a thickness of 20 μm as metallic electrodes. The size of the metallic electrodes was 125 mm (length)×4 mm (width), and the distance between the electrodes was 90 mm. Next, a 50-μm-thick PET film with a 20-μm-thick adhesive layer was laminated on the metallic electrodes and the first transparent resin protective layer except the connecting portions of the metallic electrodes, to form a second transparent resin protective layer, whereby a transparent panel heater was completed.

The resistance between both the electrodes of the thus obtained transparent panel heater was 6Ω. This transparent panel heater was placed in a thermostatic tank at −20° C. and then allowed to stand. Afterward, a voltage of 13 V was applied thereto, and as a result, the surface temperature of the transparent panel heater rose up to +1° C. in one minute. That is, a temperature rise of 21° C. took place.

EXAMPLE 9

A laminated film comprising silver (thickness=12 nm) and silicon nitride (thickness=30 nm) was deposited on a polycarbonate film having a visible light transmission of 90% and a thickness of 100 μm by a DC magnetron sputtering process to form a transparent conductive film. Next, an electrode-underlying-layer comprising copper and having a thickness of 2 nm was deposited on this transparent conductive film by the DC magnetron sputtering process to form a laminate.

Onto the electrode-underlying-layer of the thus obtained laminate except for portions reserved for the formation of electrodes, a UV-setting acrylic resin resist ink was applied and then cured to form a first transparent resin protective layer. Afterward, this laminate was immersed in an aqueous acid solution of pH 1, and electroplating was then carried out in a nickel sulfamate plating bath at pH 3.5 to form nickel films having a thickness of 20 μm as metallic electrodes. The size of the metallic electrodes was 35 mm (length)×4 mm (width), and the distance between the electrodes was 90 mm. Next, an acrylic urethane resin layer was laminated on the metallic electrodes and the first transparent resin protective layer except the connecting portions of the metallic electrodes, to form a second transparent resin protective layer, whereby a transparent panel heater was completed.

The resistance between both the electrodes of the thus obtained transparent panel heater was 5Ω. This transparent panel heater was placed in a thermostatic tank at −20° C. and then allowed to stand. Afterward, a voltage of 12 V was applied thereto, and as a result, the surface temperature of the transparent panel heater rose up to +2° C. in one minute. That is, a temperature rise of 22° C. took place.

EXAMPLE 10

A laminated film comprising indium oxynitride (thickness=30 nm), silver+10% by weight of copper (thickness=12 nm) and silicon oxynitride (thickness=30 nm) was deposited on a PET film having a visible light transmission of 89% and a thickness of 125 μm by a DC magnetron sputtering process to form a transparent conductive film. Next, an electrode-underlying-layer comprising copper and having a thickness of 2 nm was deposited on this transparent conductive film by the DC magnetron sputtering process to form a laminate.

Onto the electrode-underlying-layer of the thus obtained laminate except for portions reserved for the formation of electrodes, a UV-setting polyester acrylate was applied and then cured to form a first transparent resin protective layer. Afterward, this laminate was immersed in an aqueous acid solution of pH 1, and electroplating was then carried out in a nickel sulfamate plating bath at pH 3.5 to form nickel films having a thickness of 20 μm as metallic electrodes. The size of the metallic electrodes was 125 mm (length)×4 mm (width), and the distance between the electrodes was 90 mm. Next, a PET film having a thickness of 25 μm was laminated on the metallic electrodes and the first transparent resin protective layer except the connecting portions of the metallic electrodes, to form a second transparent resin protective layer, whereby a transparent panel heater was completed.

The resistance between both the electrodes of the thus formed transparent panel heater was 4Ω. This transparent panel heater was placed in a thermostatic tank at −20° C. and then allowed to stand. Afterward, a voltage of 13 V was applied thereto, and as a result, the surface temperature of the transparent panel heater rose up to +2° C. in one minute. That is, a temperature rise of 22° C. took place.

EXAMPLE 11

A laminated film comprising silicon nitride (thickness=30 nm), silver (thickness=12 nm), silicon nitride (thickness=30 nm) and indium oxide (thickness=20 nm) was deposited on a PET film having a visible light transmission of 89% and a thickness of 100 μm by a DC magnetron sputtering process to form a transparent conductive film. Next, an electrode-underlying-layer comprising copper and having a thickness of 2 nm was deposited on this transparent conductive film by the DC magnetron sputtering process to form a laminate.

Onto the electrode-underlying-layer of the thus obtained laminate except for portions reserved for the formation of electrodes, a UV-setting transparent polyol acrylate was applied and then cured to form a first transparent resin protective layer. Afterward, this laminate was immersed in an aqueous acid solution of pH 2, and electroplating was then carried out in a nickel sulfamate plating bath at pH 4.5 to form nickel films having a thickness of 20 μm as metallic electrodes. The size of the metallic electrodes was 125 mm (length)×4 mm (width), and the distance between the electrodes was 90 mm. Next, a 25-μm-thick PET film with a 20-μm-thick adhesive layer was laminated on the metallic electrodes and the first transparent resin protective layer except the connecting portions of the metallic electrodes, to form a second transparent resin protective layer, whereby a transparent panel heater was completed.

The resistance between both the electrodes of the thus formed transparent panel heater was 5Ω. This transparent panel heater was placed in a thermostatic tank at −20° C. and then allowed to stand. Afterward, a voltage of 13 V was applied thereto, and as a result, the surface temperature of the transparent panel heater rose up to +2° C. in one minute. That is, a temperature rise of 22° C. took place.

EXAMPLE 12

A laminated film comprising aluminum oxynitride (thickness=40 nm), titanium (thickness=1 nm), a metallic layer comprising silver+3% by weight gold (thickness=10 nm) and silicon oxynitride (thickness=30 nm) was deposited on a PES film having a visible light transmission of 88% and a thickness of 100 μm by a high-frequency ion plating process to form a transparent conductive film having a visible light transmission of 80%, a surface resistance of 8Ω/□ and an infrared reflectance of 92%. Next, an electrode-underlying-layer comprising palladium and having a thickness of 2 nm was further deposited on this transparent conductive film by the high-frequency ion plating process to form a laminate.

Onto the electrode-underlying-layer of the thus obtained laminate except for portions reserved for the formation of electrodes, a thermosetting polyester was applied and then cured to form a first transparent resin protective layer. Afterward, this laminate was immersed in an aqueous acid solution of pH 1, and electroplating was then carried out in a nickel sulfamate plating bath at pH 3.5 to form nickel films having a thickness of 20 μm as metallic electrodes. The size of the metallic electrodes was 35 mm (length)×4 mm (width), and the distance between the electrodes was 90 mm. Next, a PET film having a thickness of 25 μm was laminated on the first transparent resin protective layer and the electrodes except the connecting portions of the metallic electrodes, to form a second transparent resin protective layer, whereby a transparent panel heater was completed.

The resistance between both the electrodes of the thus obtained transparent panel heater was 5Ω. This transparent panel heater was placed in a thermostatic tank at −20° C. and then allowed to stand. Afterward, a voltage of 12 V was applied thereto, and as a result, the surface temperature of the transparent panel heater rose up to +1° C. in one minute. That is, a temperature rise of 21° C. took place.

EXAMPLE 13

A laminated film comprising silicon nitride (thickness=30 nm), silver (thickness=12 nm), silicon nitride (thickness=70 nm), silver (thickness=10 nm) and silicon nitride (thickness=30 nm) was deposited on a PET film having a visible light transmission of 89% and a thickness of 125 µm by a high-frequency ion plating process to form a transparent conductive film having a visible light transmission of 82%, a surface resistance of 6Ω/□ and an infrared reflectance of 95%. Next, an electrode-underlying-layer comprising copper and having a thickness of 2 nm was further deposited on this transparent conductive film by the high-frequency ion plating process to form a laminate.

Onto the electrode-underlying-layer of the thus obtained laminate except for portions reserved for the formation of electrodes, a thermosetting polyester was applied and then cured to form a first transparent resin protective layer. Afterward, this laminate was immersed in an aqueous acid solution of pH 1, and electroplating was then carried out in a nickel sulfamate plating bath at pH 3.5 to form nickel films having a thickness of 20 µm as metallic electrodes. Next, a PET film having a thickness of 25 µm was laminated on the first transparent resin protective layer and the electrodes except the connecting portions of the metallic electrodes, to form a second transparent resin protective layer.

The thus obtained transparent laminate was used as a filter for electromagnetic wave shield by grounding the metallic electrodes, instead of being used as a transparent panel heater, and in this case, an attenuation value of 20 dB or more was confirmed.

EXAMPLE 14

A laminated film comprising silicon nitride (thickness=30 nm), silver (thickness=10 nm), silicon nitride (thickness=60 nm), silver (thickness=10 nm) and silicon nitride (thickness=60 nm), silver (thickness=10 nm) and silicon nitride (thickness=30 nm) was deposited on a PET film having a visible light transmission of 88% and a thickness of 50 µm by a DC magnetron sputtering process to form a transparent conductive film having a visible light transmission of 70%, a surface resistance of 4Ω/□ and an infrared reflectance of 96%. Next, an electrode-underlying-layer comprising copper and having a thickness of 2 nm was further deposited on this transparent conductive film by the DC magnetron sputtering process to form a laminate.

The thus obtained laminate was interposed between two polyvinyl butyral films having a thickness of 0.38 mm, and the resulting laminate was further interposed between two glass plates having a thickness of 3 mm to prepare a glass sandwich.

Control Example 1

A transparent conductive film having the same size and the same constitution as in Example 1 was prepared as a substrate of a transparent panel heater, and a conductive coating material (a silver paste) was applied onto both ends of this transparent conductive film over a width of 4 mm of each end to form electrodes of the transparent panel heater. Afterward, a temperature rise test was carried out by applying a voltage of 13 V thereto. As a result, heat was abnormally generated between the transparent conductive film and the vicinity (the conductive coating material) of the electrodes of the transparent panel heater, and burning occurred and so the transparent conductive film was disconnected.

Control Example 2

A laminated film comprising indium oxide (thickness=30 nm), silver (thickness=10 nm) and indium oxide (thickness=30 nm) was deposited on one surface of the same PET film as in Example 1 by a high-frequency ion plating process, and an electrode-underlying-layer comprising copper and having a thickness of 2 nm and was further deposited thereon by the same process. The thus obtained laminate was subjected to a pretreatment by immersing it in an aqueous sulfuric acid solution of pH 2, washed with water, and then dried. The surface resistance of the thus obtained laminate was as high as 500Ω/□, so that it was impossible to carry out electroplating for the sake of the formation of metallic electrodes.

Control Example 3

The same procedure as in Example 1 was carried out except that any electrode-underlying-layer was not formed on a transparent conductive layer on a PET film having the same size and the same constitution as in Example 1, to obtain a transparent panel heater having metallic electrodes of nickel. Resistance between the electrodes of this transparent panel heater was 10Ω. The metallic electrodes (nickel films) formed by electroplating had an uneven plating state and many pinholes, and they were easily peeled from the transparent conductive layer.

As is apparent from the above-mentioned examples and comparative examples, according to the present invention, a manufacturing process can be improved and a transparent panel heater having high reliability can be manufactured.

It is to be noted that variations and modifications of the transparent panel heater, process of making same and transparent laminate, disclosed herein will be evident to those skilled in the art. It is intended that all such modifications and variations be included within the scope of the appended claims.

What is claimed is:

1. A transparent laminate obtained by laminating
   (a) at least one transparent thin layer made of an oxynitride of at least one selected from the group consisting of silicon, indium, tin, boron, aluminum, gallium and silicon carbide, or made of a hydride nitride of at least one selected from said group, and
   (b) at least one substantially light-transmittable metallic layer, on a surface of a transparent substrate.

2. The transparent laminate according to claim 1 wherein said metallic layer is a silver thin layer or a thin layer containing silver as a main component.

3. The transparent laminate according to claim 1 wherein said metallic layer is a laminate of
   (i) a silver thin layer or a thin layer containing silver as a main component, and
   (ii) another thin layer containing a metal other than silver as a main component.

4. The transparent laminate according to claim 1 wherein the transparent thin layer, the metallic layer, a second transparent thin layer made according to (a), a second metallic layer according to (b) and a third transparent thin layer according to (a) are laminated in this order on at least one surface of the transparent substrate.

5. The transparent laminate according to claim 2 wherein the transparent thin layer, the metallic layer, a second transparent thin layer according to (a), a second metallic layer according to (b) and a third transparent thin layer according to (a) are laminated in this order on at least one surface of the transparent substrate.

6. The transparent laminate according to claim 3 wherein the transparent thin layer, the metallic layer, a second transparent thin layer according to (a), a second metallic layer according to (b) and a third transparent thin layer according to (a) are laminated in this order on at least one surface of the transparent substrate.

7. The transparent laminate according to claim 1 wherein the transparent thin layer, the metallic layer, a second transparent thin layer according to (a), a second metallic layer according to (b), a third transparent thin layer according to (a), a third metallic layer according to (b) and a fourth transparent thin layer according to (a) are laminated in this order on at least one surface of the transparent substrate.

8. The transparent laminate according to claim 2 wherein the transparent thin layer, the metallic layer, a second transparent thin layer according to (a), a second metallic layer according to (b), a third transparent thin layer according to (a), a third metallic layer according to (b) and a fourth transparent thin layer according to (a) are laminated in this order on at least one surface of the transparent substrate.

9. The transparent laminate according to claim 3 wherein the transparent thin layer, the metallic layer, a second transparent thin layer according to (a), a second metallic layer according to (b), a third transparent thin layer according to (a), a third metallic layer according to (b) and a fourth transparent thin layer according to (a) are laminated in this order on at least one surface of the transparent substrate.

10. The transparent laminate according to claim 1 wherein said transparent substrate consists of a transparent plastic film.

11. The transparent laminate according to claim 1 wherein (a) is at least one transparent thin layer made of an oxynitride.

* * * * *

UNITED STATES PATENT AND TRADEMARK OFFICE
CERTIFICATE OF CORRECTION

PATENT NO. : 5,750,267

DATED: : May 12, 1998

INVENTOR(S) : Mitsuo TAKASE et al

It is certified that error appears in the above-identified patent and that said Letters Patent is hereby corrected as shown below:

Column 18,

Please amend claim 1 as follows:

1. A transparent laminate obtained by laminating (a) at least one transparent thin layer made of <u>a silicon oxinitride, said at least one transparent thin layer having a content of nitrogen to total content of nitrogen and oxygen of 50% or more by atomic fraction</u>, and (b) at least one substantially light-transmittable metallic layer, on a surface of a transparent <u>plastic</u> substrate.

Delete claims 4-11.

Signed and Sealed this

Ninth Day of November, 1999

*Attest:*

Q. TODD DICKINSON

*Attesting Officer*   *Acting Commissioner of Patents and Trademarks*